US009070213B2

(12) United States Patent
Crow et al.

(10) Patent No.: US 9,070,213 B2
(45) Date of Patent: Jun. 30, 2015

(54) TILE BASED PRECISION RASTERIZATION IN A GRAPHICS PIPELINE

(75) Inventors: Franklin C. Crow, Portola Valley, CA (US); Blaise A. Vignon, Stanford, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 671 days.

(21) Appl. No.: 11/494,398

(22) Filed: Jul. 26, 2006

(65) Prior Publication Data
US 2008/0024497 A1 Jan. 31, 2008

(51) Int. Cl.
G06T 15/00 (2011.01)

(52) U.S. Cl.
CPC .................... G06T 15/005 (2013.01)

(58) Field of Classification Search
None
See application file for complete search history.

(56) References Cited

U.S. PATENT DOCUMENTS

| 4,208,810 | A | | 6/1980 | Rohner et al. |
| 4,918,626 | A | | 4/1990 | Watkins et al. |
| 5,543,935 | A | | 8/1996 | Harrington |
| 6,160,557 | A | * | 12/2000 | Narayanaswami ............ 345/422 |
| 6,259,460 | B1 | | 7/2001 | Gossett et al. |
| 6,323,874 | B1 | | 11/2001 | Gossett |
| 6,480,205 | B1 | * | 11/2002 | Greene et al. .................. 345/631 |
| 6,611,272 | B1 | | 8/2003 | Hussain et al. |
| 6,614,448 | B1 | * | 9/2003 | Garlick et al. ................. 345/605 |
| 6,717,576 | B1 | * | 4/2004 | Duluk et al. ................... 345/419 |
| 6,734,861 | B1 | * | 5/2004 | Van Dyke et al. ............. 345/506 |
| 6,803,916 | B2 | | 10/2004 | Ramani et al. |
| 6,938,176 | B1 | | 8/2005 | Alben et al. |
| 6,956,579 | B1 | | 10/2005 | Diard et al. |
| 6,961,057 | B1 | * | 11/2005 | Van Dyke et al. ............. 345/422 |
| 7,002,591 | B1 | | 2/2006 | Leather et al. |
| 7,061,495 | B1 | | 6/2006 | Leather |
| 7,075,542 | B1 | | 7/2006 | Leather |
| 7,307,638 | B2 | | 12/2007 | Leather et al. |
| 7,483,029 | B2 | | 1/2009 | Crow et al. |
| 7,633,506 | B1 | | 12/2009 | Leather et al. |
| 7,634,637 | B1 | | 12/2009 | Lindholm et al. |
| 7,965,902 | B1 | | 6/2011 | Zelinka et al. |
| 2002/0130863 | A1 | * | 9/2002 | Baldwin ........................ 345/420 |
| 2003/0058244 | A1 | * | 3/2003 | Ramani et al. ................ 345/440 |
| 2003/0163589 | A1 | | 8/2003 | Bunce et al. |
| 2004/0046764 | A1 | * | 3/2004 | Lefebvre et al. .............. 345/581 |
| 2004/0085313 | A1 | | 5/2004 | Moreton et al. |
| 2004/0130552 | A1 | | 7/2004 | Duluk, Jr. et al. |
| 2005/0052449 | A1 | * | 3/2005 | Emberling .................... 345/418 |
| 2005/0122338 | A1 | | 6/2005 | Hong et al. |
| 2006/0044317 | A1 | | 3/2006 | Bourd et al. |
| 2006/0170703 | A1 | * | 8/2006 | Liao .............................. 345/613 |
| 2006/0267981 | A1 | | 11/2006 | Naoi |

(Continued)

FOREIGN PATENT DOCUMENTS

CN 101093578 12/2007
JP 06180758 6/1994

(Continued)

Primary Examiner — Daniel Hajnik

(57) ABSTRACT

In a raster stage of a graphics processor, a method for tile based precision rasterization. The method includes receiving a graphics primitive for rasterization in a raster stage of a graphics processor and rasterizing the graphics primitive at a first level precision to generate a plurality of tiles of pixels. The tiles are then rasterized at a second level precision to generate covered pixels. The covered pixels are then output for rendering operations in a subsequent stage of the graphics processor.

15 Claims, 7 Drawing Sheets

(56) References Cited

U.S. PATENT DOCUMENTS

| | | |
|---|---|---|
| 2007/0268298 A1 | 11/2007 | Alben et al. |
| 2007/0273689 A1 | 11/2007 | Tsao |
| 2007/0296725 A1 | 12/2007 | Steiner et al. |
| 2008/0024522 A1 | 1/2008 | Crow et al. |

FOREIGN PATENT DOCUMENTS

| | | |
|---|---|---|
| JP | 10-134198 | 5/1998 |
| JP | 11195132 | 7/1999 |
| JP | 2005182547 | 7/2005 |
| WO | 0013145 | 3/2000 |

* cited by examiner

TILE BASED PRECISION RASTERIZATION IN A GRAPHICS PIPELINE

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a vertex, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to a display buffer representing each pixel.

Various traversal algorithms and various rasterization methods have been developed for computing from a graphics primitive based description to a pixel based description (e.g., rasterizing pixel-to-pixel per primitive) in a way such that all pixels within the primitives comprising a given 3-D scene are covered.

Typical solutions involve generating pixels in a unidirectional manner by systematically stepping across a scene (e.g., from left to right) line by line, and visiting each pixel of the scene. A degree of coverage for each pixel is determined as per the contribution of the various primitives comprising the scene. Other traditional solutions involve utilizing per pixel evaluation techniques to closely evaluate each of the pixels comprising a display and determine which pixels are covered by which primitives.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920× 1200 pixels or larger. The prior art rasterization solutions are increasingly becoming a bottleneck to the 3-D rendering process. As display screens inexorably increase in size, for example, to 1920 pixels wide and larger, the prior art line-by-line stepping and per pixel evaluation solutions for rasterization increasingly need larger resources to handle the computational loads. To handle such large screen sizes, the rasterization resources of a GPU needs to handle a large number of per primitive evaluation operations (e.g., polygon edge equations) on a per clock cycle basis, and the per primitive evaluation operations are required to address a correspondingly large number pixels. Thus, typical prior art GPUs do not have adequate rasterization resources to scale to large screen sizes while maintaining acceptable real-time 3-D rendering performance.

Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for tile based precision rasterization in a raster stage of the graphics processor. The method includes receiving a graphics primitive for rasterization in a raster stage of a graphics processor and rasterizing the graphics primitive at a first level precision to generate a plurality of tiles of pixels. The tiles are then rasterized at a second level precision to generate covered pixels. The covered pixels are then output for rendering operations in a subsequent stage of the graphics processor. The first level precision is typically higher than the second level precision, such that integer values for addressing the plurality of tiles at the first level precision are larger than integer values for addressing a plurality of pixels at the second level precision.

In this manner, the required precision can be adjusted in accordance with the number of individual pixels or samples that need to be addressed. For example, in one embodiment, the graphics primitives are rasterized at the first level precision to address a plurality of pixels comprising a screen image. Correspondingly, in one embodiment, the graphics primitives are rasterized at the second level precision to address a plurality of pixels comprising each of the plurality of tiles.

In so doing, embodiments of the present invention efficiently utilize the rasterization resources of a GPU to handle per primitive evaluation operations (e.g., polygon edge equations) on a per clock cycle basis, to efficiently scale to large screen sizes while maintaining acceptable real-time 3-D rendering performance.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
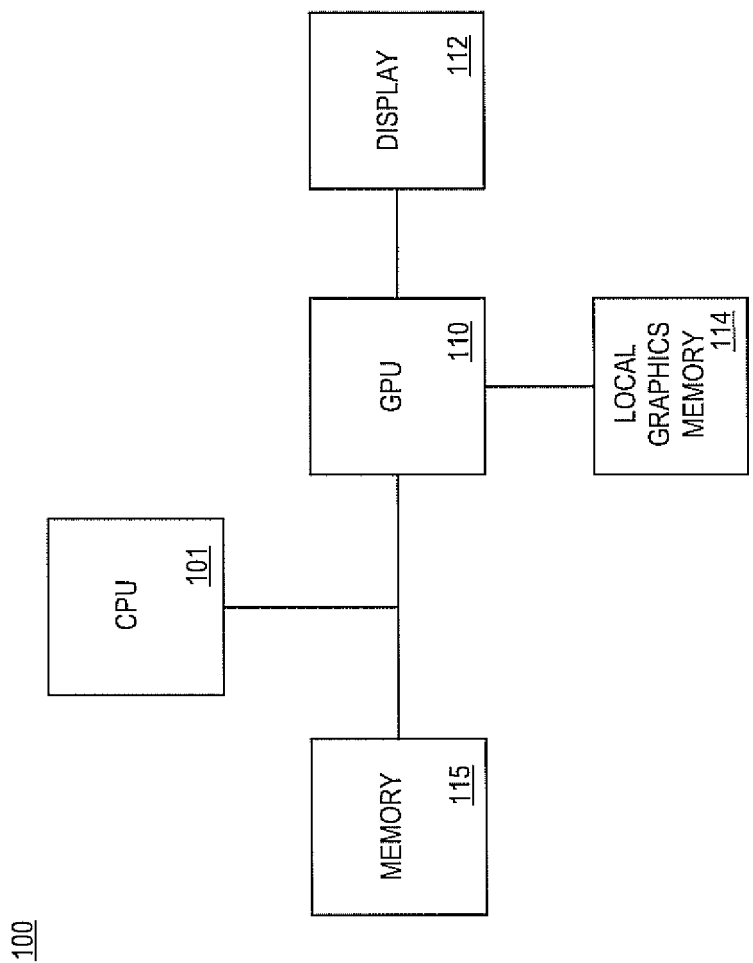
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention

Figure 2:
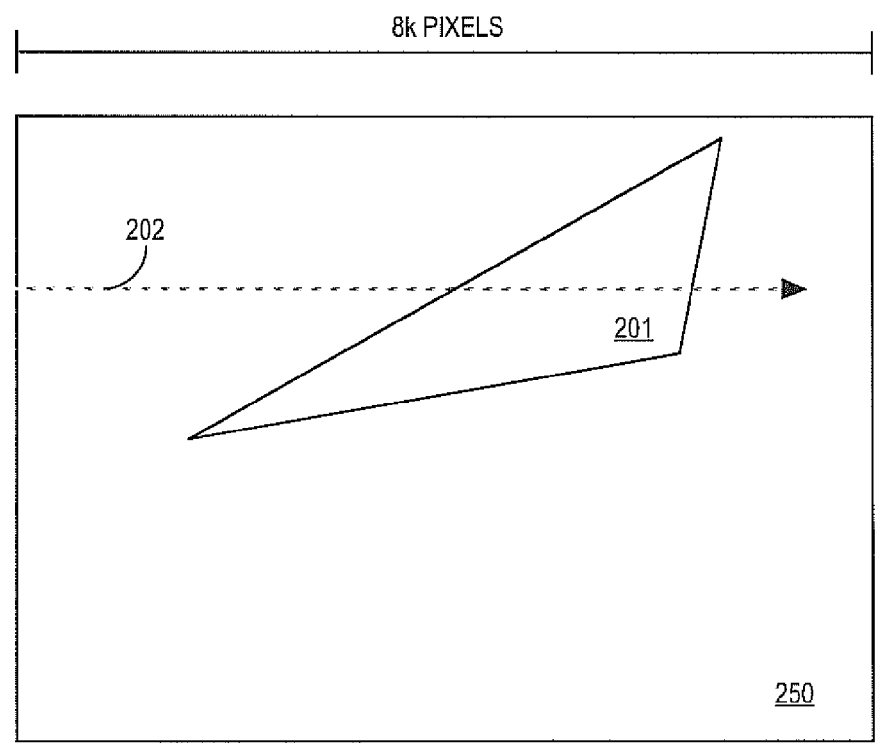
FIG. 2 shows a diagram depicting a polygon 201 on a screen for rasterization in accordance with one embodiment of the present invention.

FIG. 2 shows a diagram 200 depicting a polygon 201 on a screen 250 for rasterization in accordance with one embodiment of the present invention.

FIG. 2 depicts a rasterization process as performed in accordance with embodiments of the present invention. During the rasterization process, the coverage of a polygon, in this case the triangle 201, is broken down into its perspective contributions over individual portions of one or more tiles (e.g., 32×32 pixels per tile, 16×16 pixels per tile, 8×8 pixels per tile, or the like). For a very large triangle that covers a large number of pixels, the edge equations that define the triangle and thus define which pixels are covered, can use up a large number of bits to represent their integer operands. This is due to the fact that the triangle edge equations need to be defined with enough precision in order to allow the determination of which pixels are covered by the triangle (or other type graphics primitive).

FIG. 2 depicts a comparatively large screen 250 which, in this case, is 8 k pixels (e.g., 8192 pixels) across. With such a large screen 250, a large number of bits are required to define and address the pixels comprising the screen 250, as depicted by the exemplary line 202, where a rasterizer steps across a line of tiles from left to right across the width of the screen 250.

Figure 3:
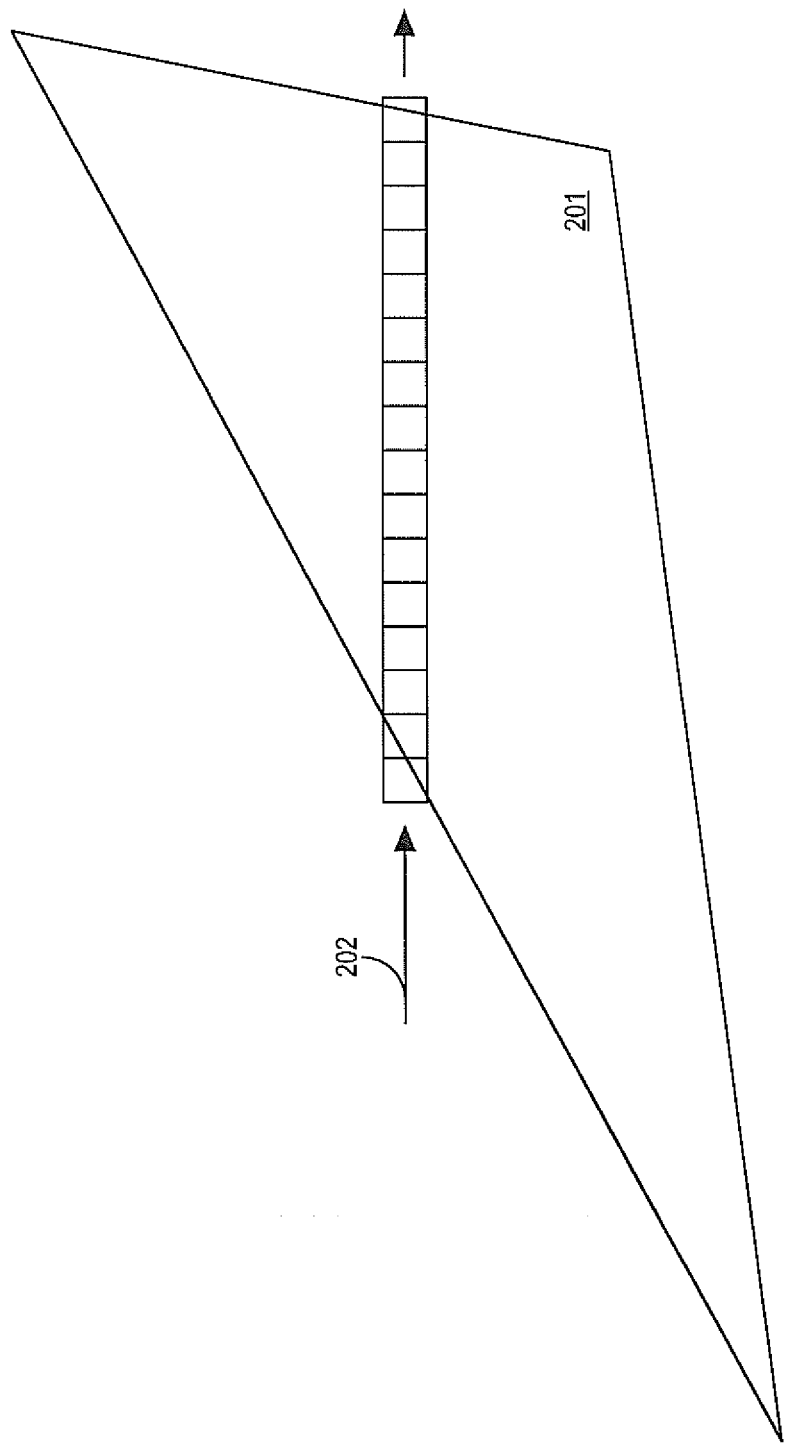
FIG. 3 shows the triangle and the covered tiles generated along the line of rasterization in accordance with one embodiment of the present invention.

FIG. 3 shows the triangle 201 and the covered tiles generated along the line of rasterization 202 in accordance with one embodiment of the present invention. As described above, the large integer operands of the triangle edge equations are used to evaluate the large triangles (e.g., triangle 201) and determine which tiles have coverage. The large integer operands of the triangle edge equations are used to stamp out those tiles having at least some coverage for the triangle. These tiles are illustrated along the line of rasterization 202. In accordance with embodiments of the present invention, once these tiles are determined, smaller integer operands can be used to evaluate which pixels within each of the tiles have coverage. This attribute takes advantage of the fact that the number of bits required to step across a tile is much lower than the number bits required to step across a large screen (e.g., screen 250).

Figure 4:
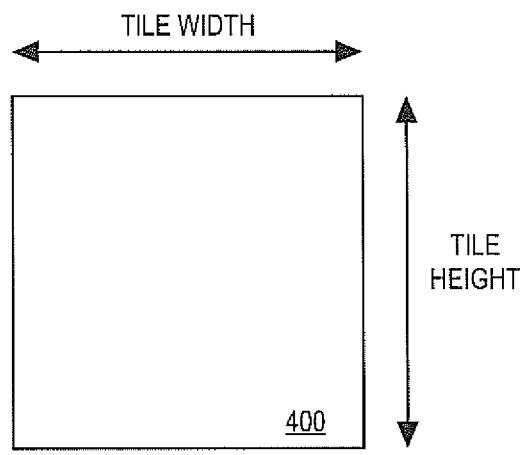
FIG. 4 shows a diagram depicting the dimensions of an exemplary tile in accordance with one embodiment of the present invention.

FIG. 4 shows a diagram depicting the dimensions of an exemplary tile 400 in accordance with one embodiment of the present invention. As described above, the number pixels comprising the tile 400 is much smaller than the number pixels that comprise a large screen (e.g., screen 250). For example, in one embodiment, tile 400 has a 32 pixel width and a 32 pixel height. In another embodiment, tile 400 has a 16 pixel width and 16 pixel height.

For the full screen image 250 of FIG. 2, the triangle edge equations need to be able to address a relatively large number pixels (e.g., 4096 or 8192 pixels). This means the triangle edge equation operands use 13 or 14 bits (e.g., a 13 bit x dimension operand and a 13 bit y dimension operand). In subsequent rasterization operations (e.g., during fine rasterization), the calculations need only address what happens within the individual tiles, such as tile 400 (e.g., 16×16 pixels). For these situations, it is sufficient to address only 16 pixels in each dimension. Therefore the arithmetic needs only to provide three or four bits of integer pixel address instead of 13 or 14, for example. Thus, for these later rasterization operations, by eliminating the most significant 10 bits, for example, a given rasterizer stage can save a significant amount of silicon area without losing useful precision. For example, in one implementation to rasterization process is divided into a coarse rasterization and a fine rasterization. During fine rasterization, when working within 32×32 tiles, the precision is adjusted from 13 or 14 bits to 5 bits.

The saved silicon area provides a number of advantages. For example, the saved silicon area can be dedicated for other purposes, such as, for example, larger memory caches, more powerful ALUs, and the like. Similarly, the smaller integer operands reduced the silicon area required for storing the operands. The saved silicon area also improves the yield of the overall GPU fabrication process and reduces power consumption of the resulting GPU die.

Thus, for example, in a case a rasterizer is working with a large screen 250, to perform the initial rasterization, the rasterizer needs to be able to address individual pixels within the 8 k range of the screen 250, thus leading to large integer operands (e.g., 14, 15 bits, or more). Once individual tiles are stamped out, the rasterizer only needs to work within the number pixels comprising the tile 400. Thus where a tile 400 is 32 pixels wide, the rasterizer only needs to address 32 pixels in the width dimension, which only requires five bits. Similarly, where a tile is 8 pixels wide, the rasterizer stage only needs to address 8 pixels in each dimension, which only requires 3 bits per dimension.

In other words, once the rasterization process proceeds to the tile level, the integer level of precision can be reduced to adequately cover the range of pixels that define the tile. For a rasterization staged that performs multilevel rasterization, this process is repeated as the tile size becomes smaller further down the rasterization pipeline. Precision is correspondingly reduced to match the number of pixels, or even the number of samples, comprising the tile.

Figure 5:
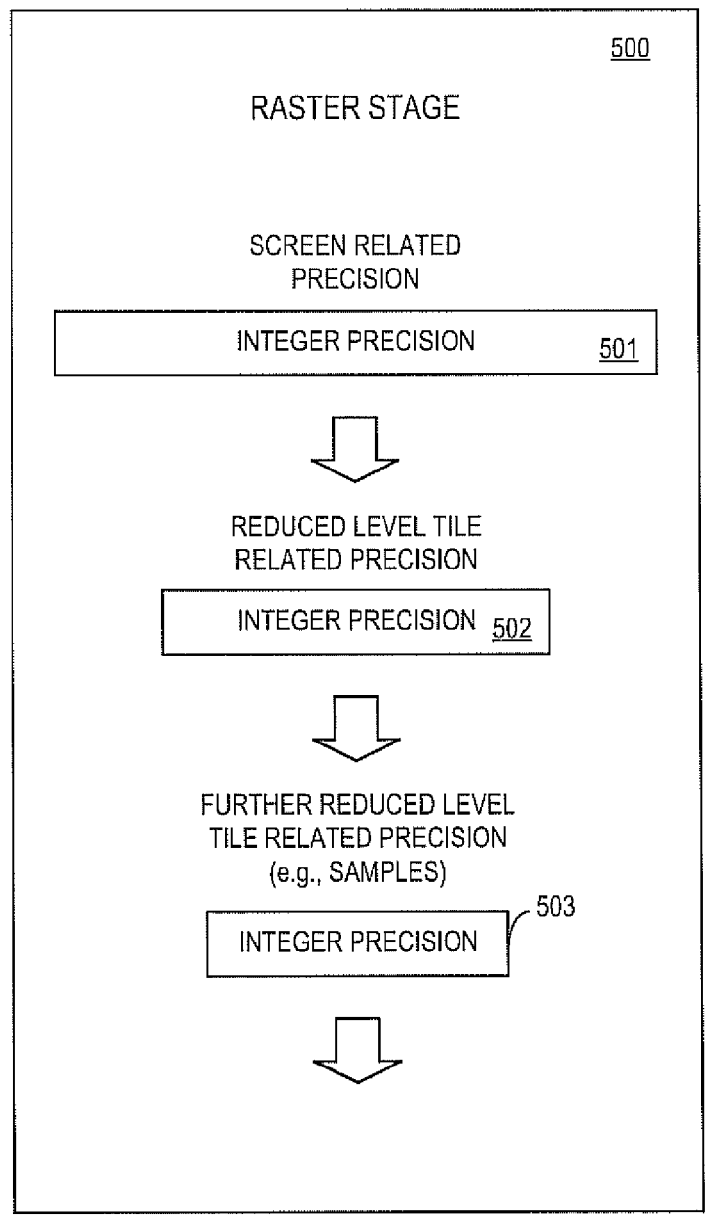
FIG. 5 shows a diagram of a tile based precision rasterization process as implemented within a raster stage in accordance with the one embodiment of the present invention.

FIG. 5 shows a diagram of a tile based precision rasterization process as implemented within a raster stage 500 in accordance with the one embodiment of the present invention. As depicted in FIG. 5, when a raster stage operates on screen related precision dimensions (e.g., screen 250 of FIG. 2) the triangle edge equation operands are at a first integer precision level, shown as integer precision level 501. When the raster stage operates on second level tile related precision, such as, for example, within the pixels that comprise an individual tile (e.g., tile 400 of FIG. 4), the triangle edge equation operands are adjusted downwards to a second precision level, thus yielding smaller integer operands, shown as integer precision level 502. Accordingly, when the raster stage operates on a third level tile related precision, such as, for example, within a sub-portion of the tile 400 (e.g., where the tile 400 is further subdivided into smaller sub-tiles) or with samples of individual pixels, the triangle edge equation operands are adjusted downwards to a third precision level, thus yielding smaller integer operands, shown as integer precision level 503.

In this manner, each time the tile size is reduced, the precision needed to address the pixels comprising the tile can be correspondingly reduced. The precision is similarly reduced when calculating samples.

Figure 6:
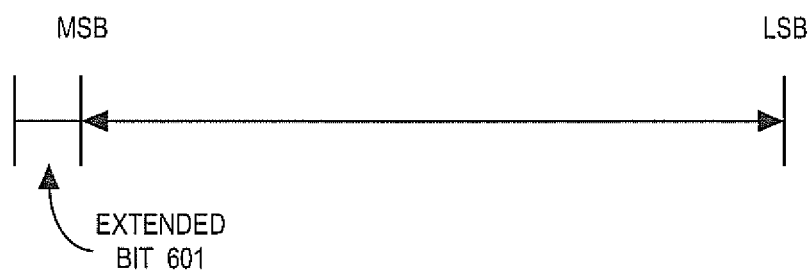
FIG. 6 shows a diagram depicting an exemplary integer operand including an extended bit in accordance with embodiments of the present invention.

FIG. 6 shows a diagram 600 depicting an exemplary integer operand including an extended bit 601 in accordance with embodiments of the present invention. FIG. 6 depicts the use of the optional use of the extended bit 601 which can be added as the most significant bit of an operand to indicate those cases where the edge of the triangle (e.g., triangle 201) lies beyond the boundary of the tile. For example, in one embodiment, the extended bit 601 would be used by the hardware of a raster stage to indicate that coverage extends beyond the boundary of the tile, as though the edge were infinitely far away.

Figure 7:
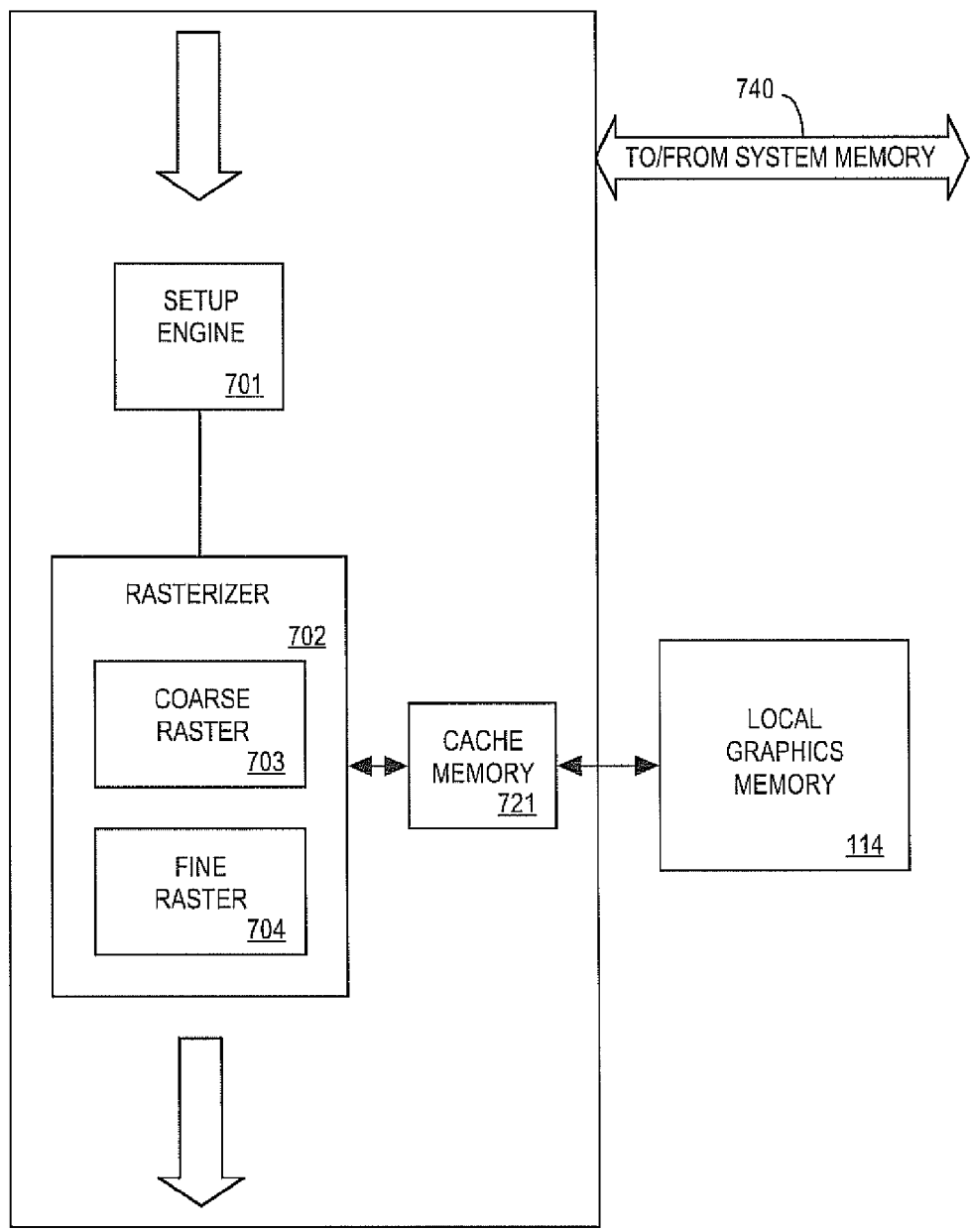
FIG. 7 shows a diagram of internal components of the GPU in accordance with one embodiment of the present invention.

FIG. 7 shows a diagram of internal components of the GPU 110 in accordance with one embodiment of the present invention. As shown in FIG. 7, the GPU 110 includes a setup engine 701 and a rasterizer unit 702. In the present embodiment, the functionality of the present invention is implemented within the hardware and software of the rasterizer unit 702. Generally, the rasterizer unit 702 functions by converting descriptions based on vertices, received from the setup engine 701, to descriptions based on edge descriptions. The rasterizer unit 702 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In the present embodiment, the rasterizer unit 702 includes a coarse raster component 703 and a fine raster component 704. The coarse raster component 703 implements the first little precision tile rasterization process as described above, as it rapidly searches a grid of tiles to identify tiles of interest (e.g., tiles that are covered by a primitive). Once the tile groups of interest are identified, the fine raster component 704 individually identifies the pixels that are covered by the primitive. Hence, in such an embodiment, the coarse raster component 703 rapidly searches a grid of pixels by using tiles, and the fine raster component 704 uses the information generated by the coarse raster component 703 and implements second-level precision, fine granularity rasterization by individually identifying pixels covered by the primitive.

Referring still to FIG. 7, the GPU 110 further includes a cache memory 721 that functions by implementing high-speed low latency storage for the most frequently used graphics rendering data. Such data typically comprises texture information, vertex information, colors, and the like. The cache memory 721 is shown coupled to the local graphics memory 114. The cache memory 721 utilizes one or more cache maintenance mechanisms to maintain coherency with the local graphics memory 114. The arrow 740 shows the communications pathway between the GPU 110 and the system memory (e.g., memory 115 shown in FIG. 1).

In one embodiment, the hardware comprising the raster unit 702 is optimized for operations on a per clock basis. For example, to provide high throughput and thereby maintain high rendering frame rates, the coarse raster component 703 and the fine raster component 704 comprise hardware designed to implement the first level precision rasterization and the second level precision rasterization on a per-clock cycle basis. The rasterizer unit 702 can be implemented such that the first level rasterization is implemented in the coarse raster component 703 that "stamps out" tiles covering a given primitive within a single clock cycle. Subsequently, the rasterization at the second level precision is implemented in the fine raster component 704 that stamps out the covered pixels of a tile in a single clock cycle. Thus for example, hardware that can process 64 pixels per clock would use a 64 pixel footprint (e.g., four tiles of 16 pixels each) while hardware that can process 128 pixels per clock would use a 128 pixel footprint (e.g., eight tiles of 16 pixels each, four tiles of 32 pixels each, etc.).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a raster stage of a graphics processor, a method for tile based precision rasterization comprising:
   receiving a graphics primitive for screen rasterization in a raster stage of a graphics processor;
   rasterizing the graphics primitive at a first level precision to generate a plurality of tiles of pixels using large integer operands of edge equations used to define said graphics primitive, wherein the rasterizing the graphics primitive comprises searching a grid of tiles to identify said plurality of tiles; and
   rasterizing the tiles at a second level precision to generate covered pixels, wherein the first level precision is higher than the second level precision, and wherein said second level of precision is based on a number of pixels in each of said plurality of tiles, wherein each of the plurality of tiles is divided into at least two portions and wherein the at least two portions are rasterized at a third level precision to address a plurality of pixels comprising each portion and wherein integer values for addressing the plurality of tiles at the first level precision are larger than integer values for addressing a plurality of pixels at the second level precision; and
   outputting the covered pixels for rendering operations in a subsequent stage of the graphics processor.

2. The method of claim 1, wherein the graphics primitives are rasterized at the first level precision to address a plurality of pixels comprising a screen image.

3. The method of claim 1, wherein the graphics primitives are rasterized at the second level precision to address a plurality of pixels comprising each of the plurality of tiles.

4. The method of claim 1, wherein the rasterizing at the first level precision is implemented on a per clock cycle basis.

5. The method of claim 1 wherein the rasterizing at the second level precision is implemented on a per clock cycle basis.

6. The method of claim 1 wherein rasterizing at the first level precision is implemented in a coarse raster unit and rasterizing at the second level precision is implemented in a fine raster unit.

7. The method of claim 1, wherein the integer values comprise a most significant bit operable to indicate an edge of said graphics primitive is beyond a boundary of a tile within said plurality of tiles.

8. The method of claim 1, wherein the rasterizing the tiles at the second level precision to generate covered pixels uses less power than rasterizing the tiles at the first level precision to generate covered pixels.

9. The method of claim 1, further comprising:
   rasterizing the tiles at a third level precision, wherein said third level of precision is based on a number of samples in each of said plurality of tiles.

10. A GPU (graphics processor unit), comprising:
    a set-up unit for generating polygon descriptions;
    a rasterizer unit coupled to the set-up unit for screen rasterizing the polygon descriptions;
    a coarse raster unit within the rasterizer unit for rasterizing a graphics primitive at a first level precision to generate a plurality of tiles of pixels using large integer operands of edge equations used to define said graphics primitive, wherein the rasterizing the graphics primitive comprises searching a grid of tiles to identify said plurality of tiles; and
    a fine raster unit within the rasterizer unit for rasterizing the graphics primitive at a second level precision, wherein the first level precision is higher than the second level precision, to generate covered pixels for rendering operations in a subsequent stage of the graphics processor unit, and wherein said second level of precision is based on a number of pixels in each of said plurality of tiles, and wherein each of the plurality of tiles is divided into at least two portions and wherein the at least two portions are rasterized at a third level precision to address a plurality of pixels comprising each portion, and wherein integer values for addressing the plurality of tiles at the first level precision are larger than integer values for addressing a plurality of pixels at the second level precision.

11. The GPU of claim 10, wherein the graphics primitives are rasterized at the first level precision to address a plurality of pixels comprising a screen image.

12. The GPU of claim 10, wherein the graphics primitives are rasterized at the second level precision to address a plurality of pixels comprising each of the plurality of tiles.

13. The GPU of claim 10, wherein the rasterizing at the first level precision is implemented on a per clock cycle basis.

14. The GPU of claim 10 wherein the rasterizing at the second level precision is implemented on a per clock cycle basis.

15. A computer system, comprising:
a system memory;
a central processor unit coupled to the system memory; and
a graphics processor unit communicatively coupled to the central processor unit;
a set-up unit within the graphics processor unit for generating polygon descriptions;
a rasterizer unit within the graphics processor unit and coupled to the set-up unit for screen rasterizing the polygon descriptions; and
a coarse raster component within the rasterizer unit, wherein the coarse raster component is configured to receive a graphics primitive for rasterization in a raster stage of the graphics processor unit, rasterize the graphics primitive at a first level precision to generate a plurality of tiles of pixels using large integer operands of edge equations used to define said graphics primitive, wherein the rasterizing the graphics primitive comprises searching a grid of tiles to identify said plurality of tiles, and rasterize the tiles at a second level precision to generate covered pixels, and wherein the covered pixels are output for rendering operations in a subsequent stage of the graphics processor unit, wherein the first level precision is higher than the second level precision, and wherein said second level of precision is based on a number of pixels in each of said plurality of tiles, and wherein each of the plurality of tiles is divided into at least two portions and wherein the at least two portions are rasterized at a third level precision to address a plurality of pixels comprising each portion, and wherein integer values for addressing the plurality of tiles at the first level precision are larger than integer values for addressing a plurality of pixels at the second level precision.

* * * * *